Nov. 24, 1942.                E. R. KOPPEL                 2,303,127
             THERMOSTAT CONTROL FOR DOMESTIC WATER HEATERS
                         Filed May 6, 1940
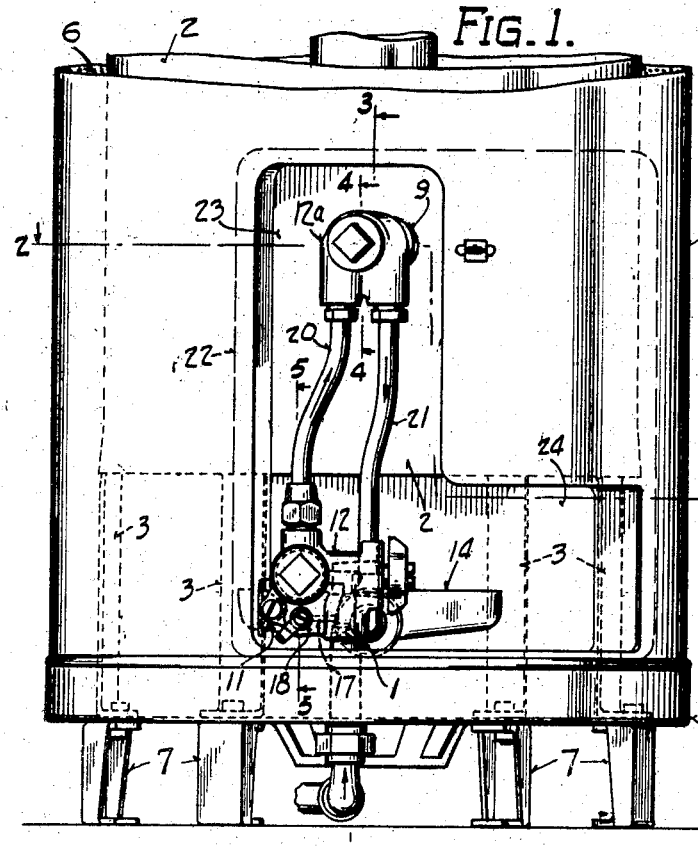
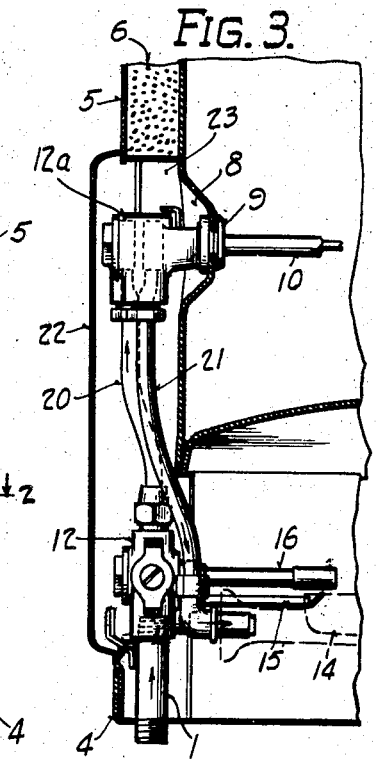
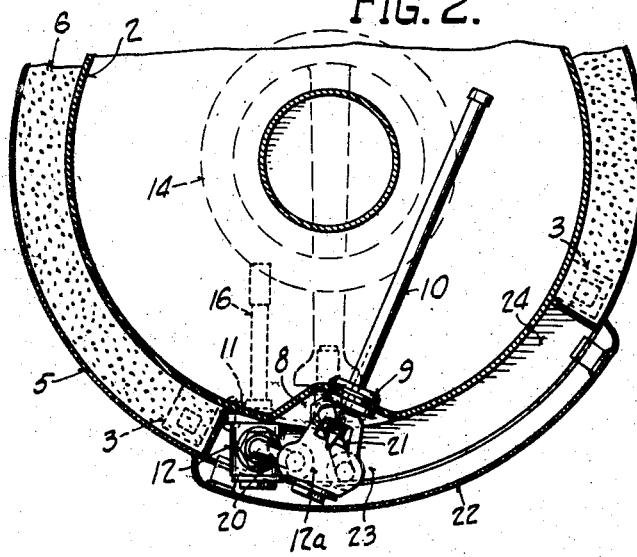
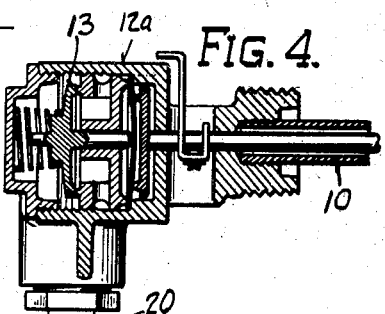
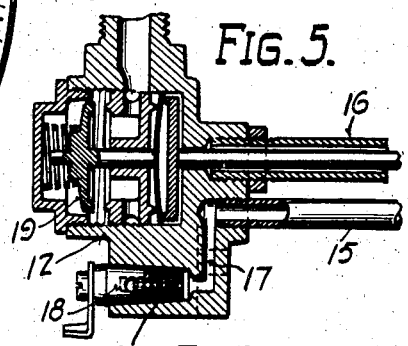
Ernst R. Koppel
INVENTOR.
BY *Elwin A. Andrus*
ATTORNEY.

Patented Nov. 24, 1942

2,303,127

UNITED STATES PATENT OFFICE 2,303,127

THERMOSTAT CONTROL FOR DOMESTIC
WATER HEATERS

Ernst R. Koppel, Wauwatosa, Wis., assignor to A.
O. Smith Corporation, Milwaukee, Wis., a corporation of New York Application May 6, 1940, Serial No. 333,613

2 Claims. (Cl. 236—20)

This invention relates to thermostat control for domestic water heaters.

Heretofore controls for gas heaters have been designed to extend outside of the outer casing of the heater and together with the piping they constituted an unsightly appearance. This has seriously affected the stream lined appearance attempted to be given to domestic water heaters.

Furthermore, the placing of the valves and adjustment mechanism on the outside exposes them to improper handling by children and others.

The principal object of the present invention is to provide a thermostat control and valve construction which is entirely enclosed in the stream lined casing of the heater.

Another object is to provide a control employing standard valve mechanism with a more simple and less costly arrangement of the control.

Other objects will appear hereinafter in connection with the description of the preferred embodiment of the invention illustrated in the accompanying drawing.

In the drawing:

Figure 1 is a front elevation of a part of a domestic water heater with the door 22 removed to show the arrangement of the gas control and burner which are normally concealed thereby;

Fig. 2 is a transverse section taken on line 2—2 of Fig. 1 showing the front of the tank and the controls;

Fig. 3 is a vertical section taken on line 3—3 of Fig. 1 showing the control valves in side elevation;

Fig. 4 is a vertical section taken on line 4—4 of Fig. 1 showing the water heating thermostat and control valve; and Fig. 5 is a vertical section taken on line 5—5 of Fig. 1 showing the pilot thermostat and control valve.

In accordance with the invention the gas supply pipe 1 connects with the control devices beneath the tank 2. The tank 2 which is connected to the water system for the house, is supported on legs 3 which are fastened to the heater bottom 4. A casing 5 covers the tank and insulation 6 fills the space therebetween. Legs 7 preferably in registry with legs 3 support the structure.

The control devices constitute two units, the thermostat valve 12a, which is attached to the tank 2, and the safety pilot and shut off valve assembly 12 which is attached to one of the legs 3. For this purpose the tank 2 has a depression 8 formed in its side wall at a suitable distance above the bottom and a threaded bushing 9 is provided in the depression to receive the main water heater thermostat 10 which extends into the tank, and the leg 3 has a lug 11 welded thereto for attachment to the lower valve casing 12 of the control.

The water heater thermostat 10 may be of any desired construction and serves to operate a main control valve 13 which determines the flow of gas to the burner 14, located beneath the tank.

The safety pilot and shut off valve assembly 12 has a threaded opening for receiving the supply pipe 1 and carries a pilot burner 15 and a pilot thermostat 16. Inside the casing 12 a bypass 17 feeds the pilot burner with gas from the main supply. A manually operated rotary valve 18 opens or closes the gas to the pilot burner and is adjustable by means of screw 18a. The thermostat 16 operates a shut-off valve 19 in the casing 12 to shut off the main supply to the burner when the pilot becomes extinguished.

In operation the gas enters through supply pipe 1 to casing 12 where a small amount passes through the bypass 17 and valve 18 to the pilot burner 15. Assuming that the burner 15 is lighted, the thermostat 16 becomes hot and allows the shut-off valve 19 to open allowing the gas to pass from casing 12 through pipe 20 to the chamber of valve 13. The water in tank 2 being cold, the thermostat 10 has already opened valve 13 and the gas passes through this valve and down through pipe 21 to the burner 14. When the water in tank 2 becomes heated to the desired temperature, the thermostat 10 operates valve 13 to shut off the gas supply.

The construction of the thermostats 10 and 16 and of the control valves 13 and 19 may be conventional and need not be described in detail. The invention relates to the arrangement in which the gas supply pipe connects at the bottom and the valves are disposed close to the tank, inside the casing 5 so as to protect the same from injury and improve the appearance of the heater.

In the construction shown, a door 22 is hinged or otherwise secured to the outer casing to cover the control devices. The control devices are disposed in a pocket 23 in the insulation 6. In addition to this, an opening 24 between the tank 2 and frame 4, also covered by the door 22, provides space for inserting the burner 14 and subsequently furnishes access to light the pilot 15 and to clean the burner.

Various embodiments of the invention may be employed within the scope of the claims.

The invention is claimed as follows:

1. In combination, a domestic water heater storage tank of generally upright cylindrical shape, a gas burner below the tank, a central flue passing upwardly through the tank for the gas fumes, heat insulation surrounding the tank, a cylindrical outer casing enclosing the tank and insulation and providing a space of substantially uniform minimum thickness for said insulation between the casing and tank, said tank wall having an angular depression therein for receiving a thermostat, a thermostat element extending into the tank through the wall of the depression, said element extending normal to said wall and at an angle to the radius of the tank to avoid engaging said flue, a valve casing disposed in the depression in said tank wall and the space between it and the outer casing, a valve in said valve casing operated by said thermostat, and pipe connections for supplying gas through said valve to the burner, said connections being located substantially entirely within said outer casing.

2. In combination in a domestic water heater having an upright cylindrical storage tank with a heating burner therebeneath, a cylindrical casing surrounding the tank and providing a space of substantially uniform thickness between it and the tank, heat insulating material filling said space with an opening through said material and the outer casing at one side near the bottom of the tank, the tank wall having an angular depression therein near the upper end of said opening, a pipe for supplying fuel to the burner and including a valve for controlling the supply of fuel, a thermostat for mechanically operating said valve disposed in the opening in said insulation and extending laterally through the wall of the tank at an angle to the tank radius in said depression, the control mechanism of said thermostat and valve being disposed partially within said depression and substantially within the radius of said outer casing, and a removable cover plate over the opening in said outer casing for providing access to said control mechanism.

ERNST R. KOPPEL.